United States Patent [19]
Romann et al.

[11] 3,934,561
[45] Jan. 27, 1976

[54] FUEL INJECTION SYSTEM FOR INTERNAL COMBUSTION ENGINES WITH COMBINED FUEL PUMP CONTROL SWITCH

[75] Inventors: Peter Romann, Stuttgart; Erwin Nägele, Hessigheim, both of Germany

[73] Assignee: Robert Bosch G.m.b.H., Gerlingen-Schillerhohe, Germany

[22] Filed: Oct. 4, 1974

[21] Appl. No.: 512,210

[30] Foreign Application Priority Data
Nov. 16, 1973  Germany.............................. 2357262

[52] U.S. Cl.... 123/32 EA; 123/119 R; 123/139 AW
[51] Int. Cl.² ............................................. F02B 3/00
[58] Field of Search ..... 123/32 EA:139 AW, 139 E, 123/119 R

[56]           References Cited
          UNITED STATES PATENTS
3,470,854  10/1969  Eisele et al. ..................... 123/32 EA
3,483,851  12/1969  Reichardt ......................... 123/32 EA
3,750,631   8/1973  Scholl et al. ..................... 123/32 EA
3,777,727  12/1973  Kirchner et al. ............. 123/139 AW
3,782,339   1/1974  Scholl et al. ..................... 123/32 EA
3,817,225   6/1974  Paiegez ............................ 123/139 E Primary Examiner—Charles J. Myhre
Assistant Examiner—Paul Devinsky
Attorney, Agent, or Firm—Flynn & Frishauf

[57]           ABSTRACT

To reliably permit closing of a switch controlling operation of a fuel supply pump which provides pressurized fuel to a fuel injection system, even under low air flow conditions in the induction pipe of an internal combustion engine, an auxiliary spring is arranged to counteract the force of a reset spring against which a deflection flap or disk in the induction pipe of the engine is deflectable. The auxiliary spring is active only over a limited range of deflection, from rest position, and immediately adjacent thereto, so that the fuel pump will not be dis-connected under low air flow conditions.

7 Claims, 3 Drawing Figures

FUEL INJECTION SYSTEM FOR INTERNAL COMBUSTION ENGINES WITH COMBINED FUEL PUMP CONTROL SWITCH

CROSS REFERENCE TO RELATED PATENT

U.S. Pat. No. 483,851, Reichardt

The present invention relates to fuel injection systems for internal combustion engines, and more particularly to such systems in which the amount of fuel being injected for each injection stroke depends on the amount of air being sucked in by the internal combustion engine through an air inlet, or induction pipe, which includes a device to provide an output signal representative of the quantity of air passing to the engine, such as a deflection flap valve, deflectable against a spring.

Various types of fuel injection systems have been proposed; in one such system, a flap valve is included in the induction pipe, or inlet tube to the internal combustion engine, which is deflectable against a spring and which controls the setting of the slider of an electrical potentiometer. Upon change in the position of the flap valve, as the air sucked in by the engine changes, the position of the slider on the potentiometer likewise changes. A voltage impressed across the potentiometer thus, at the slider, provides an output signal which is representative of the quantity of air being sucked in by the engine. The flap, or vane, in the induction pipe is, preferably, also connected to a switch controlling operation of a fuel supply pump. When the flap or vane is in quiescent or rest condition, the switch is opened, so that the fuel supply pump need not operate, since no fuel is demanded. The flap or vane in the induction tube to the engine is reset by a reset spring which is so arranged that it provides an essentially constant reset force to the vane throughout the entire range of deflection of the flap, or vane. The condition may, therefore, arise that when very small quantities of air are to be sucked in, the deflection disk will not deflect from rest condition due to the relatively high reset force of the reset spring. The fuel pump will then be disconnected, although the engine would require fuel.

It is an object of the present invention to improve a fuel injection system in such a manner than an air flow meter, located in the induction pipe of an internal combustion engine, will provide an indication, by deflection of a flap or vane or the meter even if the quantity of air required by the engine is very small so that, upon even small air requirements, the flap will deflect and reliably control switching of circuits, for example operate the switch of the fuel pump.

SUBJECT MATTER OF THE PRESENT INVENTION

Briefly, an additional, auxiliary force is provided in addition to the reset force which is directed counter the reset force, and so arranged that it is effective only in a small range adjacent the rest, or quiescent position of the flap; preferably, an additional, or auxiliary spring is provided, the spring force of which is effective upon small deflections of the deflecting flap, vane, or disk of the air flow apparatus to counter the force of the reset spring.

The invention will be described by way of example with reference to the accompanying drawings, wherein.

Figure 1:
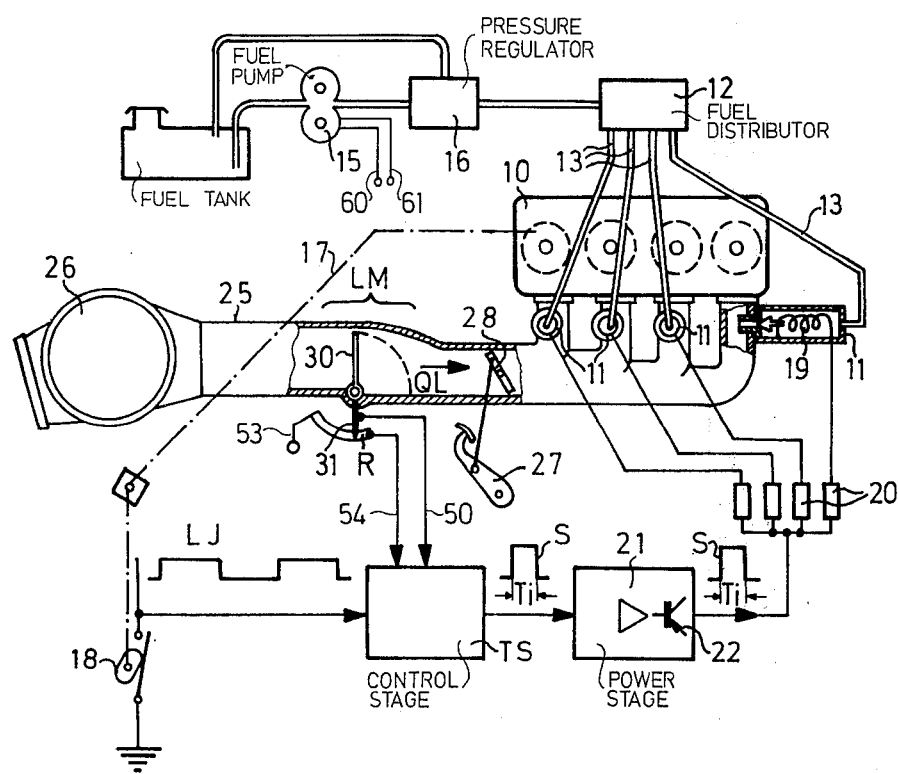
FIG. 1 is a highly schematic representation of an electrically controlled intermittent fuel injection system having a mass air flow meter in the induction pipe thereof.

The present invention will be explained in connection with a four-cylinder four-cycle internal combustion engine 10 (FIG. 1). Engine 10, essentially, has four electromagnetically operated fuel injection valves 11, receiving pressurized fuel from a fuel distributor 12, and distributing fuel, under pressure, over individual fuel supply lines 13 to the injection valves 11. A fuel supply pump 15 takes fuel from a tank T and supplies it through a pressure regulator 16 to the distributor 12. A pulse signal source 18 is controlled from the crankshaft 17 (shown schematically only) of the engine to provide two essentially square wave pulses for each rotation of the crankshaft. The pulses in turn control the electronic fuel injection control system which provides output pulses to the valves 11 to open the valves 11 for a predetermined fuel injection time period Ti. The time of opening of the valves, then, controls the quantity of fuel being injected, that is, the quantity of fuel which is emitted from the valves 11, provided the fuel is at a standard normal pressure. The pressure in the distributor 12 and hence lines 13 is approximately 2 atm gauge. Electromagnetically operating windings 19 of the valves are connected in series with a decoupling resistor 20, each, and, in turn, are connected to a common amplification and power stage 21. Power stage 21 includes at least one power transistor 22, having its emitter-collector path connected in series with the de-coupling resistors 20, which, in turn, are connected in series with coils 19, the other terminal of which is grounded.

The amount of air being sucked into the cylinders upon each suction stroke determines the quantity of fuel which can be completely combusted during the subsequent working stroke. For good combustion efficiency of the engine it is necessary that the relationship of fuel and air be accurately controlled, for example that excess air is present after each working stroke. An air quantity meter LM is located in the induction tube 25 of the internal combustion engine 10, behind air filter 26 (with respect to air flow) but in advance of throttle 28, the position of which can be controlled by the accelerator pedal 27. The air quantity meter 30 provides an output signal which permits accurate setting of the width Ti of the fuel injection pulse so that the quantity of air and fuel being supplied to the cylinders of the engine will have the desired predetermined relationship. The air quantity meter LM, basically, comprises a disk, vane or flap 30, in the form of a back-pressure disk coupled to a variable resistor R. The slider or tap 31 of the resistor R, which, then, forms a potentiometer, is moved along the resistor in accordance with the deflection of the flap or disk 30 from a rest, or quiescent position. The air quantity meter LM is connected to a transistorized circuit TS which provides controlled pulses S for the power stage 21 of the fuel injection system.

Figure 2:
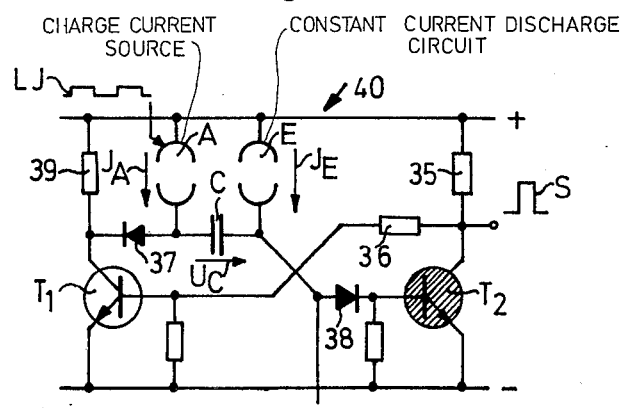
FIG. 2 is a highly schematic and fragmentary diagram of the electronic portion of the fuel injection system which controls the quantity of fuel being injected as a function of air flow.

The transistorized circuit TS has two transistors $T_1$, $T_2$ (see FIG. 2) which are so connected that they are in mutually exclusive conditions of conduction; if the input transistor $T_1$ is conductive, then the output transistor $T_2$ is non-conductive. Conduction of the transistor $T_2$, to distinguish the non-conductive state of transistor $T_1$ is indicated in FIG. 2 by shading. The circuit further includes an energy storage device, typically a capacitor C, which forms a memory; an inductance coil could also be used. The duration of the release of stored energy, that is, discharge of the capacitor C determines the opening time Ti of the fuel injection valves 11 (FIG. 1). Before the capacitor may discharge, however, it must be charged before each discharge event in a predetermined manner.

The discharge duration is a representation, in time, of information representative of the quantity of air sucked in at each suction stroke. The capacitor C, therefore, is charged during a charge pulse LJ (FIG. 2) which extends during a predetermined constant angle of rotation of the crankshaft, by connection to a source of charging current A (FIG. 2) which provides a predetermined, fixed charge current $J_A$. The charge placed on the capacitor, to be representative of the quantity of air during each suction stroke, is controlled by the signal source 18, which forms a charge control switch, and which rotates synchronously with the crankshaft of the engine. In the present case, the signal source 18 provides signals which close the switch during a 180° angle of the crankshaft and, thereafter, open the switch during a similar angular rotation of 180° of the crankshaft. This switch is shown, schematically, by a cam-operated simple switch. In actual practice, it may be a bistable multivibrator, controlled to change state by the ignition pulses being supplied to the internal combustion engine from the ignition control system of the engine.

A trigger pulse K initiates the discharge of the capacitor. In accordance with FIG. 2, the capacitor discharges immediately after the charge thereof, that is, at angular crankshaft positions of 0°, 360°, 720°, respectively, and immediately after termination of the charge event. Discharge is initiated by blocking the output transistor T2 which, previously, was conductive. Simultaneously, the previously blocked input transistor $T_1$ is switched over into conductive state. Due to blocking of the output transistor $T_2$, sufficient base current is applied over the collector resistor 35 and the coupling resistor 36 to the base-emitter path of the input transistor $T_1$. The charge, stored during the charging time, can now flow in the direction of the conductive diode 37 and the collector-emitter path of the input transistor $T_1$. The discharge current $J_E$ will be of constant, even oven value, and maintained constant by the constant current control circuit E (FIG. 2). Such circuits are known, and indicated only schematically. The voltage $U_C$ across the capacitor C drops linearly during the discharge thereof. During discharge, the voltage on the diode 38, connected to the base of the output transistor $T_2$, drops to such a point that the output transistor $T_2$ becomes conductive. The time from discharge until the voltage has dropped to the point that the output transistor becomes conductive, determines the discharge time Ti. This time is also the time during which the input transistor $T_1$ is conductive, and then blocks. Diode 37 prevents current flow from the capacitor discharge over collector resistor 39 when the input transistor $T_1$ is blocked; thus, the next charge cycle only commences at the beginning of the next charge pulse LJ, that is, when the crankshaft of the engine has rotated by 180°, or 540°, respectively, at which time the charge source A is again connected.

At low engine speeds, in a four-cylinder automotive-type engine, for example at speeds less than 2,000 rpm, and at high loading, the air being sucked into the engine is subject to substantial pulsations. As a result, the flap in the inlet induction tube may be subject to excessive movement, and swings about a central position, which is not representative of the actual average value of air $Q_1$, with respect to time. In order to prevent mismatch of quantity of air with the amount of fuel injected, a damper arrangement 40 (FIG. 3) is associated with the air quantity meter LM (FIG. 1). The damper 40, on the one hand, prevents swings of the flap 30 beyond a position which is not representative of the time-average of the quantity of air being sucked in by the engine and, on the other hand, permits the flap 30 to follow any changes in average air being sucked in by the engine with sufficient rapidity so that the output signal will be representative of actual air requirements.

Figure 3:
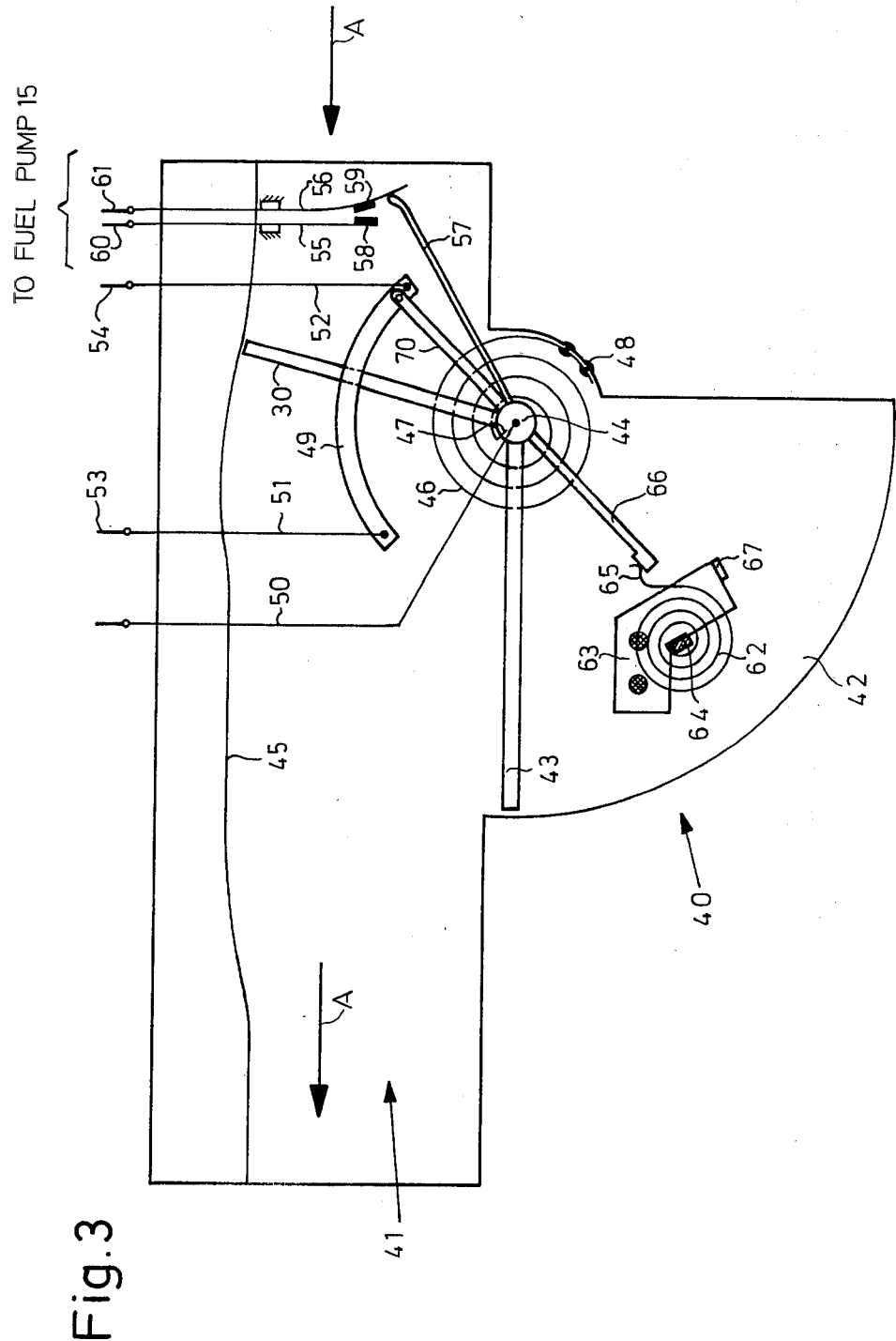
FIG. 3 is a detailed schematic view, drawn to an enlarged scale, of the air quantity, or mass air flow measuring apparatus in accordance with the present invention.

Referring now specifically to FIG. 3, in which the air meter is shown: A housing, for example made of a zinc pressure casting, is formed to have a central base plate, to which lateral side walls are fixed, which, together with a cover for example of sheet metal, form a measuring duct 41 and a damping chamber 42. The vane or flap disk 30 is located in the measuring duct 41. Flap 30 is unitary with a damping vane 43. The flap 30 and the damping vane 43 are secured to a common hub 44, to be rotatable with respect to the housing. The damping vane 43 and the metering flap 30 form an angle of about 100° with respect to the flow direction of the air, indicated by the arrows A. The measuring duct 41 is, for example, of rectangular cross section (but it may have different cross section) and forms a portion of the inlet induction pipe directing air from the filter 26 to the various respective inlet manifold stubs of the cylinder. A flange (not shown) is secured to the duct 41 for connection to the filter 26. A second flange, likewise not shown, is provided to connect the duct 41 (at the left side of the drawing of FIG. 3) to that portion of the induction tube which includes the throttle 28. The upper closing wall 45 of the duct 41 is so shaped, within the deflection region of the flap 30, that the crosssectional area for air passing by the flap increases exponentially as the flap 30 deflects in counter-clockwise direction due to air flow. This relationship permits linearization of the relative indicating error $\Delta Q_L/Q_L$ within the range of deflection of the flap 30; the relative indication error thus remains constant.

Deflection of the flap 30 and, consequently, of the damping vane 43 is effected against an essentially constant force of a reset spring 46. Spring 46 is attached at an attachment point 47 to hub 44, and further at an attachment point 48 to the housing of the air quantity meter LM. The spring force of the reset spring 47 is preferably adjustable by means, well known in the spring setting art, for example by an elongated slot, offset from the attachment 48, and the like, and not specifically shown. A slider 70 is connected to the hub 44, sliding on a resistance track 49. An electrical signal is derived from resistance track 49 which is representative of the position of the flap 30 within the duct 41. A conductor 50, connected to the hub, provides an output signal representative of slider position; terminals 53, 54 are connected to a source of operating voltage. The slider 70 on the resistance track 49 thus forms a potentiometer, with varying slider positions, the slider position being representative of the deflection of the flap 30. The line 50, providing the slider position signal, is connected to the transistorized control circuit TS (see FIG. 1), to control the source of charge current A, so that the charge current can be varied in dependence on slider position or, if desired, to change the circuit parameters of the constant current discharge circuit, so that the discharge rate of the capacitor will be varied in accordance with air quantity being required by the engine, thus, respectively, changing the time Ti of the output pulses being applied to the injection valves 11.

The pump 15 (FIG. 1) providing fuel under pressure is operated only when fuel is required. To connect the pump 15, a pair of contact terminal strips 55, 56 are provided, carrying contacts 58, 59. The contact strip 55 is rigidly secured; contact strip 56 can be moved by means of an engagement element 57, thus separating contacts 58, 59 from each other. In an angular range in which the flap 30 is deflected, the element 57 is carried along, so that contacts 58, 59 are closed, thus energizing the fuel supply pump 15 (FIG. 1). If, however, flap 30 is in its quiescent or rest position (as shown in FIG. 3), the strength of the reset spring 46 is great enough to cause the operating arm 57 to bear against the movable, resilient strip 56 and lift contact 59 from contact 58. This is a condition in which no air is required, so that the pump is disconnected. The force of the reset spring 46 is relatively great. In some operating conditions of the engine, particularly when operated as an automotive vehicle in which only very small quantities of air are required, the force of the reset spring 46 can so control the flap 30 that the contacts 58, 59 are separated, thus disabling pump 15, although a small quantity of air is still required, thus also requiring some fuel. The pump 15 itself is connected over terminals 60, 61 to the strips 55, 56. It is undesirable that the pump 15 is disabled so long as the engine is operating, thus requires some air. Fuel supply should be maintained under such operating conditions as well.

In accordance with a feature of the invention, and to permit reliable operation of the pump under all operating conditions of the engine, an additional spring 62 (FIG. 3) is provided. The inner end of spring 62 is retained in a projection 64 formed on a holding plate 63, and secured to the housing. The outer end 65 of the auxiliary spring 62 is in engagement with a projection 66, connected to the hub 44. The spring 62 is so arranged with respect to the spring 46 that it counteracts the reset force of the reset spring 46. At low deflection positions of the flap 30, therefore, the reset force is less and the arrangement ensures that even small quantities of air being sucked in by the engine permit deflection of the flap 30; in such small deflection ranges, the reset force of spring 46, effectively, is decreased. This range of deflection, in which the reset force of spring 46 is decreased, is limited by a stop 67, against which the outer end 65 of additional spring 62 can bear upon subtantial deflection of the flap 30 and hence of hub 44 and of arm 66.

In accordance with the invention, therefore, the reset force of spring 46 does not act uniformly throughout the deflection range of flap 30 but, rather, in a low deflection range of flap 30, the reset force of spring 46 is effectively decreased. In the main deflection range of flap 30, however, the reset force is determined by the spring 46 which can be accurately adjusted and calibrated, for example by moving spring 48 on the housing, by adjustment screws bearing against the spring at selected positions, and the like. In the critical range of a small deflection angle of the flap 30, however, deflection of the flap 30 and, hence, reliable operation of the contacts 58, 59 is ensured.

Various changes and modifications may be made within the scope of the inventive concept.

We claim:

1. Fuel injection system for an internal combustion engine (10) comprising
   a source of fuel (T);
   a fuel supply pump (15);
   electromagnetically operated fuel valve means (11) hydraulically connected to receive pressurized fuel from said fuel supply pump (15);
   electrical pulse generating means (TS, 22) connected to the injection vlave means (11) for controlling the operating time (Ti) thereof and hence, for controlling the amount of fuel injected during such opening time;
   and air quantity sensing means (LM) located in the induction pipe (25, 41) of the engine, connected to and providing an electrical control signal to said pulse generating means for controlling the pulse duration thereof in accordance with air flow through the induction pipe, said sensing means including a deflection member (30) located in the path of air flow through the induction pipe and means (46) acting on the deflection member for providing a reset force against deflection of the deflection member under air flow conditions,
   switch means (55, 56; 58, 59) and a switch operating means (57) connected to said flap or disk (30), said switch means being located with respect to said switch operating means to be opened when the flap or disk (30) is at rest position and to be closed when the deflection member (30) moves away from rest position, said switch means being connected to the fuel supply pump (15) for de-energizing the fuel supply pump when the engine does not require fuel, as sensed by absence of air flow in the induction pipe; and
   auxiliary force means (62) acting on the deflection member in a limited range of deflection from rest to open position and tending to decrease said reset force when the deflection member is at, or close to rest position,
   said auxiliary force means being operable for decreasing the reset force to permit movement of said deflection member away from rest position and hence reliable closing of the switch upon small air flow conditions in the induction pipe and for preventing the overriding of the deflection force of said small air flow by the reset force.

2. System according to claim 1, wherein said reset force means comprises a reset spring (46), and said auxiliary force means comprises an auxiliary spring (62) engaging said deflection member (30) only during a limited range of deflection thereof.

3. System according to claim 2, further comprising a stop means (67) located with respect to the auxiliary spring (62) to prevent engagement of said auxiliary spring with the deflection member (30) beyond a range of deflection exceeding said limited range.

4. System according to claim 2, wherein the auxiliary spring (62) is of sufficient spring force to counteract the spring force of the reset spring (46) and reliably permit deflection of the deflection member (30) under small air flow conditions in the induction pipe of the engine, and hence closing of the fuel supply switch.

5. System according to claim 2, wherein the auxiliary spring (62) comprises a spiral spring; and said deflection member (30) is formed with an extension (66), the auxiliary spiral spring (62) being located to engage said extension (66).

6. System according to claim 1, wherein said deflecting member is a flap.

7. System according to claim 1, wherein said deflecting member is a disk.

* * * * *